(12) United States Patent
Mehlberg et al.

(10) Patent No.: US 9,981,261 B1
(45) Date of Patent: May 29, 2018

(54) PROCESS FOR USING A COMPACT TWO-STAGE REGENERATOR

(71) Applicant: UOP LLC, Des Plaines, IL (US)

(72) Inventors: Robert L. Mehlberg, Wheaton, IL (US); Paolo Palmas, Des Plaines, IL (US); Michael A. Stine, Lake Zurich, IL (US); Lev Davydov, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 0 days. days.

(21) Appl. No.: 15/444,613

(22) Filed: Feb. 28, 2017

(51) Int. Cl.
 *B01J 38/34* (2006.01)
(52) U.S. Cl.
 CPC ..................... *B01J 38/34* (2013.01)
(58) Field of Classification Search
 CPC ........................................................ B01J 38/34
 USPC ........................................................... 502/43
 See application file for complete search history.

(56) References Cited

U.S. PATENT DOCUMENTS

| 4,036,779 A | 7/1977 | Schatz et al. |
| 4,849,091 A | 7/1989 | Cabrera et al. |
| 5,126,036 A * | 6/1992 | Owen .................. C10G 11/182 |
| | | 208/113 |
| 5,202,294 A | 4/1993 | Raterman |
| 2009/0107884 A1 | 4/2009 | Mehlberg |
| 2010/0025305 A1 | 2/2010 | Mehlberg |
| 2011/0284359 A1 | 11/2011 | Sechrist et al. |
| 2015/0005553 A1 | 1/2015 | Palmas et al. |

FOREIGN PATENT DOCUMENTS

EP 0610186 B1 3/2000

OTHER PUBLICATIONS

U.S. Appl. No. 15/444,652, filed Feb. 28, 2017.

* cited by examiner

*Primary Examiner* — Edward Johnson

(57) ABSTRACT

A process and apparatus for combusting coke from catalyst two stages is disclosed. Catalyst and flue gas from a lower chamber ascends to an upper chamber to be roughly separated by swirl ducts extending from a combustion conduit. The swirl ducts may discharge into a container in the upper chamber.

20 Claims, 3 Drawing Sheets

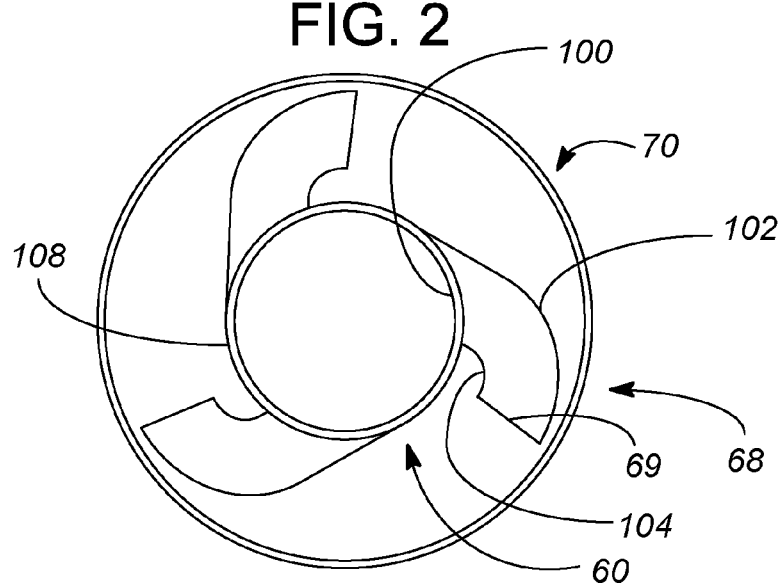
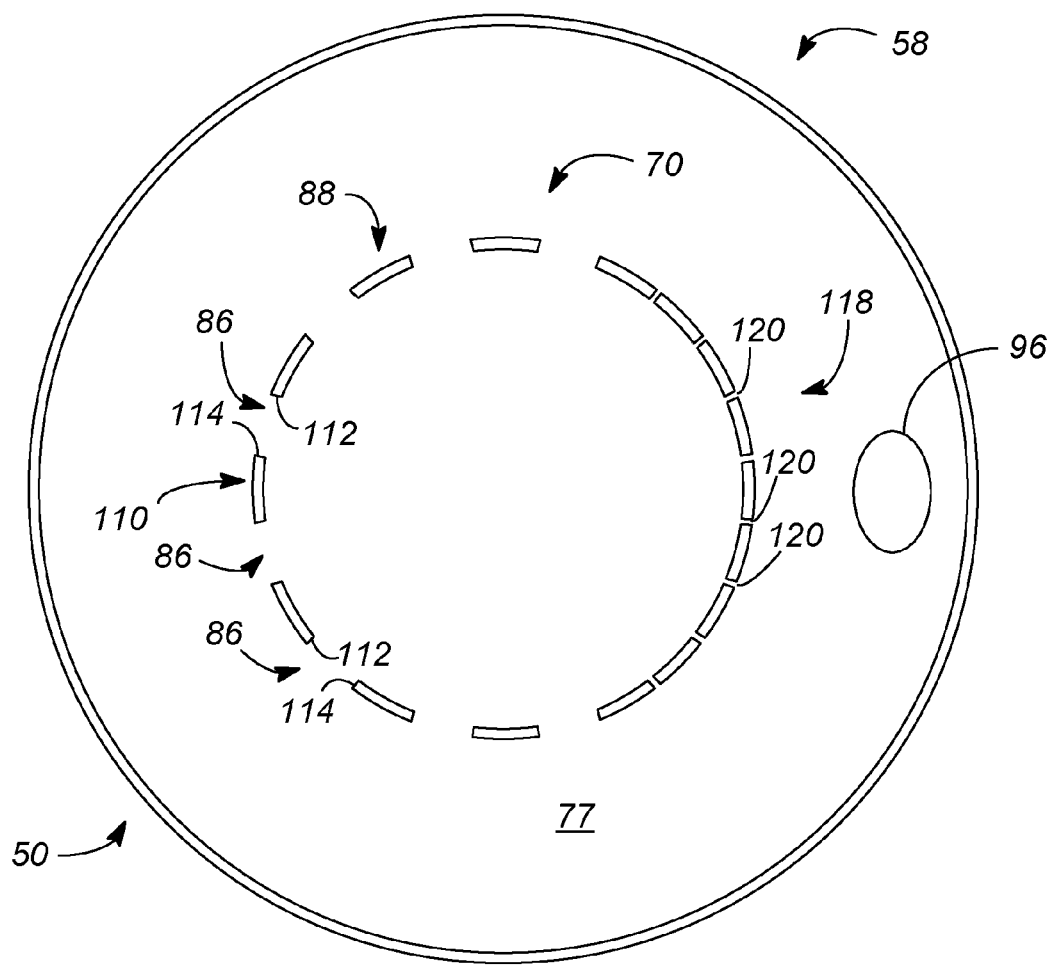

PROCESS FOR USING A COMPACT TWO-STAGE REGENERATOR

FIELD

The field of the subject matter relates to catalyst regeneration in fluidized catalytic cracking units, and more particularly relates to a two-stage regenerator.

BACKGROUND

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke is deposited on the catalyst. A high temperature regeneration operation within a regeneration zone combusts coke from the catalyst. Coke-containing catalyst, referred to herein as coked catalyst or spent catalyst, is continually removed from the reaction zone and replaced by essentially coke-free catalyst from the regeneration zone. Fluidization of the catalyst particles by various gaseous streams allows the transport of catalyst between the reaction zone and the regeneration zone.

In the regenerator, the coke is burned from the catalyst with oxygen containing gas, usually air. Flue gas formed by burning the coke in the regenerator is treated for removal of particulates and conversion of carbon monoxide, after which the flue gas may be normally discharged into the atmosphere. Conventional regenerators typically include a vessel having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator vessel.

There are several types of catalyst regenerators in use today. A conventional bubbling bed regenerator typically has just one chamber in which air is bubbled through a dense catalyst bed. Coked catalyst is added, and regenerated catalyst is withdrawn from the same dense catalyst bed. Relatively little catalyst is entrained in the combustion gas exiting the dense bed. Two-stage bubbling beds have two chambers. Coked catalyst is added to a dense bed in a first chamber and is partially regenerated with air. The partially regenerated catalyst is transported to a dense bed in a second chamber and completely regenerated with air. The completely regenerated catalyst is withdrawn from the second chamber with usually less than 0.1 wt % residual coke.

A combustor-style regenerator or high efficiency regenerator has a lower chamber called a combustor that burns nearly all the coke to $CO_2$ with little or no CO promoter and typically with low excess oxygen. A portion of the hot regenerated catalyst from the upper regenerator is recirculated to the lower combustor to heat the incoming spent catalyst and to control the combustor catalyst density and temperature for optimum coke combustion rate. As the catalyst and flue gas mixture enters an upper, narrower section of the combustor, the upward velocity is further increased and the two-phase mixture exits through a disengager into an upper chamber. The upper chamber separates the catalyst from the flue gas in the disengager and cyclones and returns the catalyst to a dense catalyst bed which supplies hot regenerated catalyst to both the riser reactor and the lower combustor chamber.

Therefore, there is a need for improved methods for combustion of coke from catalyst in vessels having a shorter elevation.

SUMMARY

In a process and apparatus, spent catalyst is partially regenerated in a lower chamber of a regenerator vessel. The partially regenerated catalyst is transported by flue gas up a conduit and is discharged through a swirl duct to achieve a rough separation of partially regenerated catalyst from flue gas in an upper chamber. A container may prevent catalyst from exiting the upper chamber through a regenerated catalyst exit without further contact with oxygen gas. The partially regenerated catalyst is further contacted with fresh oxygen gas in the upper chamber to complete the catalyst regeneration.

BRIEF DESCRIPTION OF THE DRAWINGS

FIG. 2 is a sectional view of the regenerator vessel of FIG. 1 taken at segment 2-2.

FIG. 3 is a sectional view of the regenerator vessel of FIG. 1 taken at segment 3-3.

DETAILED DESCRIPTION

Figure 1:
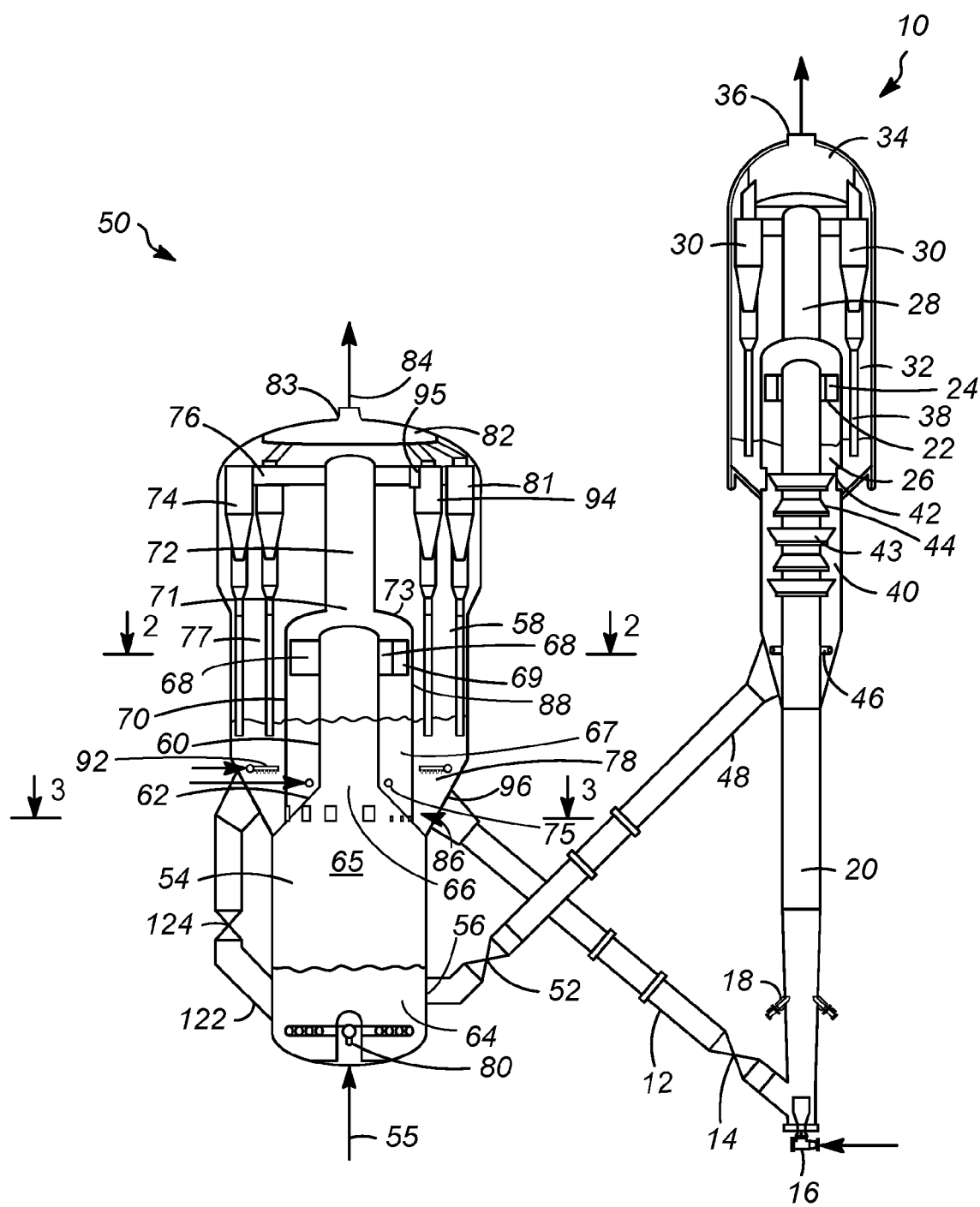
FIG. 1 is a schematic, elevational view of an FCC unit incorporating the present subject matter.

Although other uses are contemplated, the process and apparatus may be embodied in an FCC unit. FIG. 1 shows an FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. A fluidization medium such as steam from a nozzle 16 transports regenerated catalyst upwardly through the riser 20 at a relatively high density until a plurality of feed distributor nozzles 18 inject hydrocarbon feed across a flowing stream of catalyst particles. The catalyst contacts the hydrocarbon feed cracking it to produce smaller, cracked hydrocarbon products while depositing coke on the catalyst to produce coked catalyst.

A conventional FCC feedstock is suitable first hydrocarbon feed stream. The most common of such conventional fresh hydrocarbon feedstocks is a "vacuum gas oil" (VGO), which is typically a hydrocarbon material having a boiling range with an IBP of at least about 232° C. (450° F.), a T5 of at least about 288° C. (550° F.) to about 343° C. (650° F.), a T95 between about 510° C. (950° F.) and about 570° C. (1058° F.) and an EP of no more than about 626° C. (1158° F.) prepared by vacuum fractionation of atmospheric residue. VGO is generally low in coke precursors and heavy metal contamination which can serve to contaminate catalyst. Atmospheric residue is a preferred feedstock boiling with an IBP of at least about 315° C. (600° F.), a T5 between about 340° C. (644° F.) and about 360° C. (680° F.) and a T95 of between about 700° C. (1292° F.) and about 900° C. (1652° F.) obtained from the bottoms of an atmospheric crude distillation column. Atmospheric residue is generally high in coke precursors and metal contamination. Other heavy hydrocarbon feedstocks which may serve as a first hydrocarbon feed stream include heavy bottoms from crude oil, heavy bitumen crude oil, shale oil, tar sand extract, deasphalted residue, products from coal liquefaction, and vacuum reduced crudes. A suitable first hydrocarbon feed stream also includes mixtures of the above hydrocarbons and the foregoing list is not exhaustive.

The FCC catalyst can be a single catalyst or a mixture of different catalysts. Generally, the catalyst may include any of the well-known catalysts that are used in the art of FCC, such as an active amorphous clay-type catalyst and/or a high activity, crystalline molecular sieve. Zeolites may be used as molecular sieves in FCC processes. Typically, the zeolitic molecular sieves appropriate for FCC have a large average pore size. Usually, molecular sieves with a large pore size have pores with openings of greater than about 0.7 nm in effective diameter defined by greater than about 10, and typically about 12, member rings. Pore Size Indices of large pores can be above about 31. Suitable large pore zeolite catalysts may include synthetic zeolites such as X and Y zeolites, mordenite and faujasite. The zeolite can have any suitable amount of a rare earth metal or rare earth metal atoms in oxide form. Suitably, the FCC catalyst includes a large pore zeolite, such as a Y-type zeolite, and a matrix material comprising an active alumina material, a binder material, including either silica or alumina, and an inert filler such as kaolin. The ratio of zeolite to matrix in the FCC catalyst stream should be no more than 2. Other suitable FCC catalysts include Amber from Albemarle Corporation located in Baton Rouge, La., Stamina from BASF Corporation from Iselin, N.J. or Midas from WR Grace and Co. from Columbia, Md.

The resulting mixture cracked products and coked catalyst continues upwardly through the riser 20 to a top at which a plurality of disengaging ducts 22 tangentially and horizontally discharge the mixture of gas and catalyst from a top of the riser 20 through ports 24 into a disengaging vessel 26 that effects separation of gases from the catalyst. A transport conduit 28 carries the hydrocarbon vapors, including stripped hydrocarbons, stripping media and entrained catalyst to one or more cyclones 30 in a reactor vessel 32 which separates coked catalyst from the hydrocarbon vapor stream. The reactor vessel 32 may at least partially contain the disengaging vessel 26, and the disengaging vessel 26 is considered part of the reactor vessel 32. A collection chamber 34 in the reactor vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the reactor vessel 32, and the catalyst and adsorbed or entrained hydrocarbons pass into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The stripped, coked catalyst leaves the stripping section 40 of the reactor vessel 32 through a reactor catalyst conduit 48 and passes to the regenerator vessel 50 at a rate regulated by a control valve 52. The coked catalyst from the reactor vessel 32 usually contains carbon in an amount of from 0.2 to 2 wt %, which is present in the form of coke. Although coke is primarily composed of carbon, it may contain from 3 to 12 wt % hydrogen as well as sulfur and other materials.

The regenerator vessel 50 for combusting coke from catalyst comprises a lower chamber 54 and an upper chamber 58. The lower chamber has a catalyst inlet 56 for feeding coked catalyst to the lower chamber and a gas distributor 80. The gas distributor 80 distributes the combustion gas comprising oxygen from a combustion line 55 to the lower chamber 54. About 50, preferably about 60, to about 75 wt % of the total combustion gas is added to the lower chamber 54 through the distributor 80.

The catalyst inlet 56 delivers coked catalyst to the lower chamber 54 of the regenerator vessel 50 which enters a first dense catalyst bed 64. Oxygen-containing combustion gas, typically air, from the combustion gas line 55 is delivered by the distributor 80 to the lower chamber 54 of the regenerator vessel 50. The oxygen in the combustion gas contacts the coked catalyst and combusts carbonaceous deposits from the catalyst in the lower chamber 54 in a first regeneration stage to produce partially regenerated catalyst and flue gas. The flue gas lifts the partially regenerated catalyst in a dilute phase 65 above the first dense catalyst bed 64. In an embodiment, flow conditions in the lower chamber 54 will include a superficial gas velocity of about 0.9 m/s (3 ft/s), preferably about 1.1 m/s (3.5 ft/s), to about 2.1 m/s (7 ft/s) and a catalyst density of from about 8 kg/m$^3$ (0.5 lb/ft$^3$) to about 80 kg/m$^3$ (5 lb/ft$^3$) in the dilute phase 65 and from about 320 kg/m$^3$ (20 lb/ft$^3$) to about 560 kg/m$^3$ (35 lb/ft$^3$) in the first dense catalyst bed 64. Fluidization conditions in the lower chamber maintain a fast fluidized flow regime to ensure all catalyst from the lower chamber 54 enters the upper chamber 58.

A mixture of partially regenerated catalyst entrained in upwardly flowing flue gas flows through a combustion conduit 60 from a top 62 of the lower chamber 54. The combustion conduit 60 may be a vertical riser extending upwardly from an opening 66 in the top 62 of the lower chamber 54. The top 62 may comprise a frustoconical transition wall that funnels the mixture into the opening 66. The top 62 may instead be elliptical or have another configuration. The mixture is transported upwardly through the combustion conduit 60 to a top at which a plurality of swirl ducts 68 tangentially and perhaps horizontally discharge the mixture of flue gas and partially regenerated catalyst from a top of the conduit 60 through open ends 69 to effect a rough separation of flue gases from the partially regenerated catalyst by centripetal force. The duct 68 and/or open ends 69 may have a rectangular vertical cross section. The discharged mixture may enter into a container 70 in the upper chamber 58. The swirl duct 68 has a curved wall for discharging the mixture of catalyst and flue gas in a tangential, swirling direction. The denser partially regenerated catalyst swirls to the outside of the container 70, loses momentum and drops into a second dense bed 67 in the container, annularly to the conduit 60, while the less dense flue gas ascends in the container. The container 70 may be tubular, preferably cylindrical, and have a cap opening 71 in a cap 73 above the swirl duct 68. The cap opening 71 allows and directs flue gas and entrained catalyst to exit from the container 70. Oxygen is distributed into the second dense catalyst bed 67 in the container 70 by distributor 75, which may be a ring distributor, in a second stage of regeneration. In the second dense bed 67, partially regenerated catalyst is further regenerated by combustion of coke deposits to provide further regenerated, but still partially regenerated, catalyst and flue gas. The flue gas generated ascends in the container 70 and is directed through the cap opening 71 in the cap 73 and exits the container 70. The container 70 may surround the conduit 60 and be interposed between the conduit 60 and a regenerated catalyst outlet 96 of the upper chamber 58 and the regenerator vessel 50 which removes regenerated catalyst from the regenerator vessel 50. The container 70 has a wall 88 that may extend to the lower chamber 54, particularly to the top 62 of the lower chamber 54.

In an embodiment, a gas conduit 72 may extend from the cap opening 71 and carry the flue gas and entrained catalyst upwardly in the upper chamber 58. The gas conduit 72 may be directly coupled to primary cyclones 74 through a duct 76 for ducting flue gas laden with catalyst directly to primary cyclones 74 that are in downstream communication with the swirl duct 68. Primary cyclones 74 separate catalyst from flue gas and deliver separated flue gas to respective secondary cyclones 81 for further separation. Primary cyclones 74 and secondary cyclones 81 may be arranged in an outer ring in the upper chamber 58. Separated flue gas is directed from the secondary cyclones 81 into a plenum 82 and discharged from the upper chamber 58 and regenerator vessel 50 through an outlet 83 in a flue gas line 84. The primary cyclones 74 and the secondary cyclones 81 drop separated catalyst through dip legs into a third dense catalyst bed 78.

To maintain partial burn conditions in the lower chamber 54, the carbon monoxide concentration in the flue gas may be maintained at least about 200 ppm and preferably at least about 3% by mole and the $CO_2$ to CO mole ratio will be no more than about 5 and preferably no more than about 4 and at least about 0.5 and preferably at least about 1.0 at the outlet 66 from the lower chamber 54 of the regenerator vessel 50. The oxygen concentration in the flue gas exiting the outlet 66 of the lower chamber 54 is less than 0.1% and preferably no greater than 200 ppm by mole to achiever partial burn conditions in the lower chamber 54.

The partially regenerated catalyst may exit the container 70 and enter an annular interior 77 of the upper chamber 58 from the second dense bed 67 through a window 86 or a plurality of windows 86 in a wall 88 of the container 70 into a third dense catalyst bed 78. The window 86 or the plurality of windows 86 may be located in the wall 88 of the container 70 just above the top 62 of the lower chamber 54. The annular interior 77 is in the upper chamber 58 outside of the container 70 and the recovery conduit 72. Oxygen is added to the upper chamber 58 into the third dense catalyst bed 78 from a combustion gas distributor 92 which may ring around the container 70 in a third regeneration stage. The oxygen combusts remaining carbon deposits on the partially regenerated catalyst in the third dense bed 78 to fully regenerate the catalyst. Flue gas generated from the third dense bed 78 ascends and enters inner cyclones 94 that have inlets 95 open to the annular interior 77 of the upper chamber 58. Inner cyclones 94 separate catalyst from flue gas and drop separated catalyst through dip legs into the third dense catalyst bed 78 and deliver separated flue gas into the plenum 82 for discharge from the upper chamber 58 and the regenerator vessel 50 through the outlet 83 to the flue gas line 84. Inner cyclones 94 may be arranged in an inner ring in the upper chamber 58.

Completely regenerated catalyst from the third dense catalyst bed 58 is discharged from the regenerated catalyst outlet 96 in the upper chamber 58 and transferred to the regenerated catalyst conduit 12. Completely regenerated catalyst regulated by control valve 14 descends the reactor catalyst conduit 12 from the upper chamber 58 back to the reactor section 10 and enters the riser 20 where it again contacts feed as the FCC process continues.

In an embodiment, to accelerate combustion of the coke in the lower chamber 54, hot partially regenerated catalyst from a dense catalyst bed 78 in the upper chamber 58 may be recirculated into the lower chamber 54 via an external recycle catalyst conduit 122 regulated by a control valve 124. Hot partially regenerated catalyst enters an inlet of recycle catalyst conduit 122 which is connected to and in downstream communication with the upper chamber 58. Recirculation of regenerated catalyst mixes hot catalyst from the dense catalyst bed 78 with relatively cool, coked catalyst from the reactor catalyst conduit 48 entering the lower chamber 54, raises the overall temperature of the catalyst and gas mixture in the lower chamber 54.

The regenerator vessel 50 may be operated under partial burn conditions in the lower chamber 54 and the upper chamber 58. Approximately about 10 to about 35 wt % of the total gas requirements within the process enters the dense catalyst bed 78 in the upper chamber 58 with about 5 to about 15 wt % of the total gas requirements added to the container 70. The remainder of about 60 to about 75 wt % of the gas requirements may be added to the lower chamber 54. In an embodiment, combustion gas may be added to the upper chamber 58 for both combustion and fluidization purposes. If air is the combustion gas, typically 10 to 12 kg (lbs) of air are required per kilogram (pound) of coke fed on catalyst to the regenerator vessel for partial burn. The regenerator vessel 50 typically operates at a temperature of about 594° C. (1100° F.) to about 704° C. (1300° F.) in the lower chamber 58 and about 649° C. (1200° F.) to about 760° C. (1400° F.) in the upper chamber 58. Pressure may be between 173 kPa (gauge) (25 psig) and 414 kPa (gauge) (60 psig) in both chambers.

The superficial velocity of the combustion gas in the upper chamber 58, in both the container 70 and the annular interior 77, is typically between about 0.8 m/s (2.7 ft/s) and about 1.2 m/s (4.0 ft/s). The density of the second dense bed 67 and the third dense bed 78 is typically between about 400 kg/m3 (25 lb/ft3) and about 640 kg/m3 (40 lb/ft3) and the density of the dilute phase in the container 70 and the annular interior 77 is typically between about 4.8 kg/m3 (0.3 lb/ft3) and about 32 kg/m3 (2 lb/ft3) depending on the characteristics of the catalyst.

The carbon monoxide content in the flue gas is maintained at least about 200 ppm and preferably at least about 3% by mole at the flue gas outlet 83 of the upper chamber 58 of the regenerator vessel 50 and the $CO_2$ to CO mole ratio at the flue gas outlet 83 will be at least about 0.5 and preferably at least about 1 and no more than about 5 and preferably no more than about 4 to achieve partial burn combustion of coke. The oxygen concentration in the flue gas exiting the outlet 83 of the upper chamber 58 is less than 0.1% and preferably no greater than 200 ppm by mole to achieve partial burn conditions in the upper chamber. Although partial burn conditions may be maintained in the upper chamber 58, the partially regenerated catalyst from the lower chamber 54 will encounter sufficient oxygen to be completely regenerated in the upper chamber 58.

A sectional view of the container 70 taken at segment 2-2 of FIG. 1 omitting the dip legs and the upper chamber 58 is shown in FIG. 2. The mixture of partially regenerated catalyst and flue gas ascending the combustion conduit 60 exit the gas conduit and enter into swirl ducts 68. Each swirl duct 68 has an inlet 100 from the combustion conduit 60 a long curved wall 102, a short curved wall 104 and a discharge opening 69. The long curved wall 102 may be tangentially disposed with respect to a wall 108 of the combustion conduit 60. The long curved wall 102 and the short curved wall 104 impart a tangential, and preferably horizontal, direction to the mixture of partially regenerated catalyst and flue gas, so that it is discharged from the discharge opening 69 in a tangential direction with respect to the combustion conduit 60. The tangential discharge of the mixture effects a centripetal separation of partially regenerated catalyst from flue gas. The duct 68 and/or open ends 69 may have a rectangular vertical cross section.

A sectional view of the upper chamber 58 and container 70 taken at segment 3-3 of FIG. 1 omitting the dip legs is shown in FIG. 3. The wall 88 of the container 70 may be cylindrical and have a first lateral side 110 comprising opposed edges 112, 114 that define a first window 86. The first lateral side 110 is located on the wall 88 of the container 70 diametrically opposed away from the regenerated catalyst outlet 96. The first window 86 may be located on the container 70 opposed away from the regenerated catalyst outlet 96. A plurality of first windows 86 defined by opposed edges 112, 114 may be provided on the container 70. Each of the plurality of first windows 86 are positioned on the wall 88 of the container 70 nonlinearly with the regenerated catalyst outlet 96 outside of the container. In other words, no portion of the first window 86 and no portion of the regenerated catalyst outlet 96 share or can be connected by a straight line that extends only outside of the container 70 in the annular interior 77. Consequently, a portion of the wall 88 of the container is interposed between the first lateral side 110 comprising a plurality of first windows 86 and/or each of the plurality of first windows 86 and the regenerated catalyst outlet 96. The first lateral side 110 may comprise about 50 to about 75% of the lateral perimeter of the wall 88 of the container 70. The wall 88 of the container 70 may also have a second lateral side 118 comprising opposed edges that define a second window 120. The second lateral side 118 is located on the wall 88 of the container 70 diametrically facing toward the regenerated catalyst outlet 96. The second lateral side 118 may comprise about 25 to about 50% of the lateral perimeter of the wall 88 of the container 70. The second window 120 may be located on the container 70 facing the regenerated catalyst outlet 96. A plurality of second windows 120 defined by opposed edges may be provided on the container 70. The container 70 may include a plurality of second windows 120 positioned on the container linearly with the regenerated catalyst outlet 96 outside of said container. In other words, a portion of the second window 120 and a portion of the regenerated catalyst outlet 96 share or can be connected by a straight line that extends only outside of the container 70 in the annular interior 77. The first windows 86 are wider on average than the second windows 120. Each first window may be about 25 to about 50% of a diameter of the combustion conduit 60. Each second window may be about 10 to about 30% of the width of the first windows on average. The first windows 86 and the second windows 120 may have the same or about the same height. Preferably, the second windows 120 have a reduced height relative to the first windows 86. In an aspect, the second window 120 may have an area of about $\frac{1}{30}^{th}$ to about $\frac{1}{70}^{th}$ of the area of the first window 86. Moreover, the plurality of second windows 120 may have an aggregate area of about $\frac{1}{30}^{th}$ to about $\frac{1}{70}^{th}$ of an aggregate area of the plurality of first windows 86. Additionally, the plurality of first windows 86 may be spaced on centers that define angles of about 20 to about 40 degrees with an adjacent first window and the plurality of second windows 120 may be spaced on centers that define angles of about 10 to about 20 degrees with an adjacent second window.

A majority of the partially regenerated catalyst is directed through the plurality of the first windows 86 facing away from the regenerated catalyst outlet to exit from within the container 70 into the annular interior 77 of the upper chamber 58. In an aspect, at least about 75 wt % and preferably at least about 90 wt % of the partially regenerated catalyst is directed through the plurality of the first windows 86 to exit from within the container 70 into the annular interior 77 of the upper chamber 58. The partially regenerated catalyst that has passed through each of the first plurality of windows 86 must turn from a first trajectory while passing through the first window projected onto a horizontal plane to enter said regenerated catalyst outlet 96. Accordingly, the partially regenerated catalyst exiting the first windows 86 must make its way from the first side 110 of the container and be contacted with oxygen gas to undergo further regeneration before exiting the regenerated catalyst conduit 96 from the regenerator vessel 50. If much of the partially regenerated catalyst were allowed to exit from the container 70 on the second side 118, the partially regenerated catalyst could avoid or bypass further regeneration by contact with oxygen gas and leave through the regenerated catalyst outlet 96. The second windows 120 foster equalization of catalyst in the container 70 to facilitate catalyst exit through the first windows 86.

The container 70, will typically be made of stainless steel such as 304 stainless steel, and coated with abrasion resistant lining both externally and internally. The regenerator may be equipped with one or more catalyst coolers to avoid excessively hot regenerator temperatures.

Figure 4:
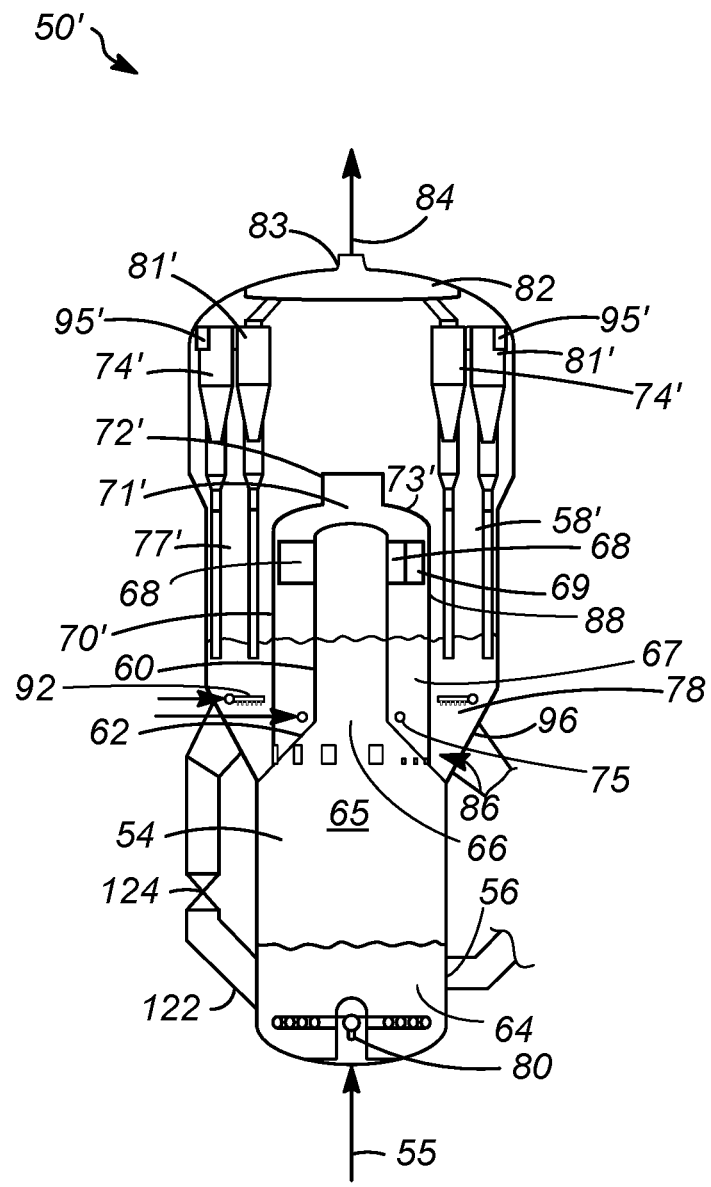
FIG. 4 is a partial elevational view of the FCC unit of FIG. 1.

FIG. 4 shows another embodiment of a regenerator vessel 50'. Elements in FIG. 4 with the same configuration as in FIG. 1 will have the same reference numeral as in FIG. 1. Elements in FIG. 4 which have a different configuration as the corresponding element in FIG. 1 will have the same reference numeral but designated with a prime symbol ('). The configuration and operation of the embodiment of FIG. 4 is essentially the same as in FIG. 1.

The embodiment of FIG. 4 omits or truncates a gas recovery conduit 72' and omits ducts connecting cyclones with the container 70'. The cap opening 71' in the cap 73' is open to the annular interior 77' of the upper chamber 58', perhaps through a truncated gas recovery conduit 72'. A mixture of flue gas and partially regenerated catalyst from the container 70' exit the cap opening 71' and perhaps a truncated gas recovery conduit 72' to enter the annular interior 77'. The mixture is drawn into inlets 95' of primary cyclones 74' which may be in an outer ring. Secondary cyclones 81' receive flue gas from the primary cyclones 74' and duct purified flue gas to the plenum 82. Everything else in FIG. 4 is the same as described for FIG. 1.

While the subject matter has been described with what are presently considered the preferred embodiments, it is to be understood that the subject matter is not limited to the disclosed embodiments, but it is intended to cover various modifications and equivalent arrangements included within the scope of the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is a catalyst regenerator vessel for combusting coke from catalyst comprising a lower chamber having a catalyst inlet for feeding spent catalyst to the lower chamber and a gas distributor for distributing combustion gas to the lower chamber; a conduit from the lower chamber extending from the lower chamber to an upper chamber; a swirl duct having a curved wall and an open end for discharging catalyst and flue gas from the conduit into the upper chamber; a cyclone in communication with the swirl duct; a flue gas outlet for discharging flue gas from the upper chamber; and a regenerated catalyst outlet from the upper chamber and the regenerator vessel. An embodiment of the invention is one, any or all of prior embodiments in this paragraph up through the first embodiment in this paragraph further comprising a container surrounding the conduit interposed between the conduit and the regenerated catalyst outlet. An embodiment of the invention is one, any or all of prior embodiments in this paragraph up through the first embodiment in this paragraph wherein the container has a wall that extends to the lower chamber. An embodiment of the invention is one, any or all of prior embodiments in this paragraph up through the first embodiment in this paragraph wherein the container has a first lateral side comprising opposed edges that define a first window; the first window located on the container opposed away from the regenerated catalyst outlet. An embodiment of the invention is one, any or all of prior embodiments in this paragraph up through the first embodiment in this paragraph wherein the container comprises a plurality of first windows positioned on the container nonlinearly with the regenerated catalyst outlet outside of the container. An embodiment of the invention is one, any or all of prior embodiments in this paragraph up through the first embodiment in this paragraph further comprising a plurality of second windows positioned on the container linear with the regenerated catalyst outlet outside of the container. An embodiment of the invention is one, any or all of prior embodiments in this paragraph up through the first embodiment in this paragraph wherein the container has a cap above the swirl duct and the cap has a cap opening therein to allow flue gas to exit from the container. An embodiment of the invention is one, any or all of prior embodiments in this paragraph up through the first embodiment in this paragraph further comprising a recovery conduit extending from the cap opening and directly coupled to the cyclone. An embodiment of the invention is one, any or all of prior embodiments in this paragraph up through the first embodiment in this paragraph further comprising a cyclone having an inlet open to an interior of the upper chamber. An embodiment of the invention is one, any or all of prior embodiments in this paragraph up through the first embodiment in this paragraph wherein the cyclone has an inlet open to an interior of the upper chamber.

A second embodiment of the invention is a catalyst regenerator vessel for combusting coke from catalyst comprising a lower chamber having a catalyst inlet for feeding spent catalyst to the lower chamber and a gas distributor for distributing combustion gas to the lower chamber; a conduit from the lower chamber extending from the lower chamber to an upper chamber; a swirl duct having a curved wall and an open end for discharging catalyst and flue gas from the conduit into the upper chamber; a container surrounding the conduit; a cyclone in communication with the swirl duct; a flue gas outlet for discharging flue gas from the upper chamber; a regenerated catalyst outlet from the upper chamber and the regenerator vessel; and a window positioned on the container nonlinearly with the regenerated catalyst outlet outside of the container. An embodiment of the invention is one, any or all of prior embodiments in this paragraph up through the second embodiment in this paragraph wherein the container has a wall that extends to the lower chamber. An embodiment of the invention is one, any or all of prior embodiments in this paragraph up through the second embodiment in this paragraph wherein the container comprises a plurality of first windows positioned on the container nonlinearly with the regenerated catalyst outlet outside of the container. An embodiment of the invention is one, any or all of prior embodiments in this paragraph up through the second embodiment in this paragraph further comprising a plurality of second windows positioned on the container linearly with the regenerated catalyst outlet outside of the container. An embodiment of the invention is one, any or all of prior embodiments in this paragraph up through the second embodiment in this paragraph wherein the container has a cap above the swirl duct and the cap has a cap opening therein to allow flue gas to exit from the container. An embodiment of the invention is one, any or all of prior embodiments in this paragraph up through the second embodiment in this paragraph further comprising a recovery conduit extending from the cap opening and directly coupled to the cyclone. An embodiment of the invention is one, any or all of prior embodiments in this paragraph up through the second embodiment in this paragraph wherein the cyclone has an inlet open to an interior of the upper chamber.

A third embodiment of the invention is a catalyst regenerator vessel for combusting coke from catalyst comprising a lower chamber having a catalyst inlet for feeding spent catalyst to the lower chamber and a gas distributor for distributing combustion gas to the lower chamber; a conduit from the lower chamber extending from the lower chamber to an upper chamber; a swirl duct having a curved wall and an open end for discharging catalyst and flue gas from the conduit into the upper chamber; a cyclone in communication with the swirl duct; a flue gas outlet for discharging flue gas from the upper chamber; a regenerated catalyst outlet from the upper chamber and the regenerator vessel; and a container surrounding the conduit interposed between the conduit and the regenerated catalyst outlet and extending to the lower chamber. An embodiment of the invention is one, any or all of prior embodiments in this paragraph up through the third embodiment in this paragraph wherein the container comprises a first window opposed away from the regenerated catalyst outlet. An embodiment of the invention is one, any or all of prior embodiments in this paragraph up through the third embodiment in this paragraph wherein the first window is positioned on the container nonlinearly with the regenerated catalyst outlet outside of the container.

A fourth embodiment of the invention is a process for combusting coke from catalyst comprising delivering coked catalyst to a lower chamber of a regenerator vessel; contacting coked catalyst with oxygen to combust coke from the coked catalyst in the lower chamber to provide partially regenerated catalyst and flue gas; transporting partially regenerated catalyst and flue gas from the lower chamber to an upper chamber of the regenerator vessel through a conduit; discharging the partially regenerated catalyst from the conduit into an upper chamber in a tangential direction to the conduit in the upper chamber to separate the partially regenerated catalyst from flue gas; contacting partially regenerated catalyst with oxygen to further combust coke from the partially regenerated catalyst in the upper chamber to produce fully regenerated catalyst and flue gas; separating the fully regenerated catalyst from flue gas in a cyclone; discharging the fully regenerated catalyst from the regenerator vessel through an outlet from the upper chamber; and discharging flue gas from the upper chamber. An embodiment of the invention is one, any or all of prior embodiments in this paragraph up through the fourth embodiment in this paragraph further comprising discharging the partially regenerated catalyst from the conduit within a container. An embodiment of the invention is one, any or all of prior embodiments in this paragraph up through the fourth embodiment in this paragraph further comprising directing a majority of partially regenerated catalyst from within the container through a plurality of first windows facing away from the outlet. An embodiment of the invention is one, any or all of prior embodiments in this paragraph up through the fourth embodiment in this paragraph wherein the partially regenerated catalyst that has passed through the first windows must turn from a first trajectory while passing through the first windows projected onto a horizontal plane to enter the outlet and is contacted with oxygen gas. An embodiment of the invention is one, any or all of prior embodiments in this paragraph up through the fourth embodiment in this paragraph further comprising contacting partially regenerated catalyst with oxygen in the container to further combust coke from the partially regenerated catalyst in the container to further regenerate partially regenerated catalyst to produce further regenerated catalyst and flue gas. An embodiment of the invention is one, any or all of prior embodiments in this paragraph up through the fourth embodiment in this paragraph further comprising directing flue gas from within the container through a cap opening in the container upwardly. An embodiment of the invention is one, any or all of prior embodiments in this paragraph up through the fourth embodiment in this paragraph further comprising ducting the flue gas through the cap opening in a recovery conduit directly to a cyclone. An embodiment of the invention is one, any or all of prior embodiments in this paragraph up through the fourth embodiment in this paragraph further comprising discharging flue gas into an open interior of the upper chamber and then separating the flue gas from entrained partially regenerated catalyst in a cyclone.

A fifth embodiment of the invention is a process for combusting coke from catalyst comprising delivering coked catalyst to a lower chamber of a regenerator vessel; contacting coked catalyst with oxygen to combust coke from the coked catalyst in the lower chamber to provide partially regenerated catalyst and flue gas; transporting partially regenerated catalyst and flue gas from the lower chamber to an upper chamber of the regenerator vessel through a conduit; discharging the partially regenerated catalyst from the conduit into a container in an upper chamber; contacting partially regenerated catalyst with oxygen in the container to further combust coke from the partially regenerated catalyst in the container to further regenerate partially regenerated catalyst to produce further regenerated catalyst and flue gas; passing the further regenerated catalyst from the container into the upper chamber; contacting the further regenerated catalyst with oxygen to further combust coke from the further regenerated catalyst in the upper chamber to produce fully regenerated catalyst and flue gas; separating the fully regenerated catalyst from flue gas in a cyclone; discharging the fully regenerated catalyst from the regenerator vessel through an outlet from the upper chamber; and discharging flue gas from the upper chamber. An embodiment of the invention is one, any or all of prior embodiments in this paragraph up through the fifth embodiment in this paragraph further comprising discharging the partially regenerated catalyst from the conduit in a tangential direction to the conduit in the a container to separate the partially regenerated catalyst from flue gas. An embodiment of the invention is one, any or all of prior embodiments in this paragraph up through the fifth embodiment in this paragraph further comprising directing a majority of partially regenerated catalyst from within the container through a plurality of first windows facing away from the outlet. An embodiment of the invention is one, any or all of prior embodiments in this paragraph up through the fifth embodiment in this paragraph wherein the partially regenerated catalyst that has passed through the first windows must turn from a first trajectory while passing through the first windows projected onto a horizontal plane to enter the outlet and is contacted with oxygen gas. An embodiment of the invention is one, any or all of prior embodiments in this paragraph up through the fifth embodiment in this paragraph further comprising directing flue gas from within the container through a cap opening in the container upwardly. An embodiment of the invention is one, any or all of prior embodiments in this paragraph up through the fifth embodiment in this paragraph further comprising ducting the flue gas through the cap opening in a recovery conduit directly to a cyclone. An embodiment of the invention is one, any or all of prior embodiments in this paragraph up through the fifth embodiment in this paragraph further comprising discharging flue gas into an open interior of the upper chamber and then separating the flue gas from entrained partially regenerated catalyst in a cyclone.

A sixth embodiment of the invention is a process for combusting coke from catalyst comprising delivering coked catalyst to a lower chamber of a regenerator vessel; contacting coked catalyst with oxygen to combust coke from the coked catalyst in the lower chamber to provide partially regenerated catalyst and flue gas; transporting partially regenerated catalyst and flue gas from the lower chamber to an upper chamber of the regenerator vessel through a conduit; discharging the partially regenerated catalyst from the conduit into a container in an upper chamber; directing a majority of the partially regenerated catalyst from within the container through a plurality of first windows facing away from a regenerated catalyst outlet; contacting the partially regenerated catalyst with oxygen to combust coke from the partially regenerated catalyst in the upper chamber to produce fully regenerated catalyst and flue gas; separating the fully regenerated catalyst from flue gas in a cyclone; discharging the fully regenerated catalyst from the regenerator vessel through the regenerated catalyst outlet from the upper chamber; and discharging flue gas from the upper chamber. An embodiment of the invention is one, any or all of prior embodiments in this paragraph up through the sixth embodiment in this paragraph further comprising discharging the partially regenerated catalyst from the conduit in a tangential direction to the conduit in the a container to separate the partially regenerated catalyst from the flue gas. An embodiment of the invention is one, any or all of prior embodiments in this paragraph up through the sixth embodiment in this paragraph wherein the partially regenerated catalyst that has passed through the first windows must turn from a first trajectory while passing through the first windows projected onto a horizontal plane to enter the outlet and is contacted with oxygen gas. An embodiment of the invention is one, any or all of prior embodiments in this paragraph up through the sixth embodiment in this paragraph further comprising directing flue gas from within the container through a cap opening in the container upwardly. An embodiment of the invention is one, any or all of prior embodiments in this paragraph up through the sixth embodiment in this paragraph further comprising discharging flue gas into an open interior of the upper chamber and then separating the flue gas from entrained partially regenerated catalyst in a cyclone.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for combusting coke from catalyst comprising:
   delivering coked catalyst to a lower chamber of a regenerator vessel;
   contacting coked catalyst with oxygen to combust coke from the coked catalyst in the lower chamber to provide partially regenerated catalyst and flue gas;
   transporting partially regenerated catalyst and flue gas from the lower chamber to an upper chamber of the regenerator vessel through a conduit;
   discharging said partially regenerated catalyst from said conduit into an upper chamber in a tangential direction to said conduit in said upper chamber to separate said partially regenerated catalyst from flue gas;
   contacting partially regenerated catalyst with oxygen to further combust coke from said partially regenerated catalyst in the upper chamber to produce fully regenerated catalyst and flue gas;
   separating said fully regenerated catalyst from flue gas in a cyclone;
   discharging said fully regenerated catalyst from said vessel through an outlet from said upper chamber; and
   discharging flue gas from said upper chamber.

2. The process of claim 1 further comprising discharging said partially regenerated catalyst from said conduit within a container.

3. The process of claim 1 further comprising directing a majority of partially regenerated catalyst from within said container through a plurality of first windows facing away from said outlet.

4. The process of claim 3 wherein said partially regenerated catalyst that has passed through said first windows must turn from a first trajectory while passing through said first windows projected onto a horizontal plane to enter said outlet and is contacted with oxygen gas.

5. The process of claim 2 further comprising contacting partially regenerated catalyst with oxygen in said container to further combust coke from said partially regenerated catalyst in the container to further regenerate partially regenerated catalyst to produce further regenerated catalyst and flue gas.

6. The process of claim 1 further comprising directing flue gas from within said container through a cap opening in said container upwardly.

7. The process of claim 6 further comprising ducting said flue gas through said cap opening in a recovery conduit directly to a cyclone.

8. The process of claim 6 further comprising discharging flue gas into an open interior of said upper chamber and then separating said flue gas from entrained partially regenerated catalyst in a cyclone.

9. A process for combusting coke from catalyst comprising:
   delivering coked catalyst to a lower chamber of a regenerator vessel;
   contacting coked catalyst with oxygen to combust coke from the coked catalyst in the lower chamber to provide partially regenerated catalyst and flue gas;
   transporting partially regenerated catalyst and flue gas from the lower chamber to an upper chamber of the regenerator vessel through a conduit;
   discharging said partially regenerated catalyst from said conduit into a container in an upper chamber;
   contacting partially regenerated catalyst with oxygen in said container to further combust coke from said partially regenerated catalyst in the container to further regenerate partially regenerated catalyst to produce further regenerated catalyst and flue gas;
   passing said further regenerated catalyst from said container into said upper chamber;
   contacting said further regenerated catalyst with oxygen to further combust coke from said further regenerated catalyst in the upper chamber to produce fully regenerated catalyst and flue gas;
   separating said fully regenerated catalyst from flue gas in a cyclone;
   discharging said fully regenerated catalyst from said vessel through an outlet from said upper chamber; and
   discharging flue gas from said upper chamber.

10. The process of claim 9 further comprising discharging said partially regenerated catalyst from said conduit in a tangential direction to said conduit in said a container to separate said partially regenerated catalyst from flue gas.

11. The process of claim 9 further comprising directing a majority of partially regenerated catalyst from within said container through a plurality of first windows facing away from said outlet.

12. The process of claim 11 wherein said partially regenerated catalyst that has passed through said first windows must turn from a first trajectory while passing through said first windows projected onto a horizontal plane to enter said outlet and is contacted with oxygen gas.

13. The process of claim 9 further comprising directing flue gas from within said container through a cap opening in said container upwardly.

14. The process of claim 13 further comprising ducting said flue gas through said cap opening in a recovery conduit directly to a cyclone.

15. The process of claim 9 further comprising discharging flue gas into an open interior of said upper chamber and then separating said flue gas from entrained partially regenerated catalyst in a cyclone.

16. A process for combusting coke from catalyst comprising:
   delivering coked catalyst to a lower chamber of a regenerator vessel;
   contacting coked catalyst with oxygen to combust coke from the coked catalyst in the lower chamber to provide partially regenerated catalyst and flue gas;
   transporting partially regenerated catalyst and flue gas from the lower chamber to an upper chamber of the regenerator vessel through a conduit;
   discharging said partially regenerated catalyst from said conduit into a container in an upper chamber;
   directing a majority of said partially regenerated catalyst from within said container through a plurality of first windows facing away from a regenerated catalyst outlet;
   contacting said partially regenerated catalyst with oxygen to combust coke from said partially regenerated catalyst in the upper chamber to produce fully regenerated catalyst and flue gas;

separating said fully regenerated catalyst from flue gas in a cyclone;

discharging said fully regenerated catalyst from said vessel through said regenerated catalyst outlet from said upper chamber; and discharging flue gas from said upper chamber.

17. The process of claim 16 further comprising discharging said partially regenerated catalyst from said conduit in a tangential direction to said conduit in said a container to separate said partially regenerated catalyst from said flue gas.

18. The process of claim 16 wherein said partially regenerated catalyst that has passed through said first windows must turn from a first trajectory while passing through said first windows projected onto a horizontal plane to enter said outlet and is contacted with oxygen gas.

19. The process of claim 16 further comprising directing flue gas from within said container through a cap opening in said container upwardly.

20. The process of claim 19 further comprising discharging flue gas into an open interior of said upper chamber and then separating said flue gas from entrained partially regenerated catalyst in a cyclone.

* * * * *